Dec. 17, 1968

J. H. KREHBIEL 3,417,214

SWITCH CONNECTOR

Filed March 16, 1965

2 Sheets-Sheet 1

Inventor
John H. Krehbiel
By: Olson, Trexler, Wolters & Bushnell Attys.

Dec. 17, 1968 J. H. KREHBIEL 3,417,214

SWITCH CONNECTOR

Filed March 16, 1965 2 Sheets-Sheet 2

Inventor
John H. Krehbiel
By Olson, Trexler, Wolters & Bushnell
Attys.

1

3,417,214

SWITCH CONNECTOR

John H. Krehbiel, Downers Grove, Ill., assignor to Molex Products Company, Downers Grove, Ill., a corporation of Illinois Continuation-in-part of application Ser. No. 396,631, Sept. 15, 1964. This application Mar. 16, 1965, Ser. No. 440,075

7 Claims. (Cl. 200—51)

ABSTRACT OF THE DISCLOSURE

A switch-connector combination comprising a molded plastic housing adapted to be secured to a base plate as of a phonograph record changer by means of integral bayonet arms. The housing carries three pins in a straight line array, the butt ends of two of the pins serving as fixed switch contacts. A movable shorting bar moves in and out of engagement with these two pins as a result of movement of a switch actuator. The extending ends of all three pins serve as male connectors for receipt of a complementary plug having female connectors. The housing includes a skirt into which a fourth grounding pin secured to the base plate extends in parallel straight line array with the first three pins. The housing skirt provides a pair of laterally extending chutes for receipt of motor leads having terminals thereon which slip over two of the pins.

This application comprises a continuation-in-part of my copending application Ser. No. 396,631, filed Sept. 15, 1964, now Patent No. 3,275,766 for "Switch Connector."

The present invention relates to a novel connector for an electrical switch, and more specifically to a novel switch-connector having particular utility as a combination phonograph record changer switch-amplifier connector. More particularly yet, the invention relates to a unique connector for a snap action or slide switch for a record changer to simplify the connection of wires to the record changer and to an amplifier therefor.

The switch to which this invention relates, but to which the invention is not to be limited, may be a conventional snap action or slide switch for use with a record changer of a phonograph. Such a switch usually has a switch arm which actuates a record changer responsive to the position of a phonograph tone arm on a phonograph record or which may be actuated manually.

Typically such a switch is provided with a plurality of lead wires; and after securement of the switch to the record changer, the lead wires are connected operatively to a receptacle located some distance away. Other phonograph wires are provided for suitable connection to one or more amplifiers. Additionally, suitable lines are provided for electrical actuation of the record changer or phonograph motor.

As will be understood, each additional step in the assembly of a phonograph record changer requires additional expenditure of time and costs the manufacturer money, resulting in additional manufacturing costs which must be passed on to the ultimate consumer.

A pair of wires from the record changer switch must be connected to the record changer motor. Other wires must be connected to one or more phonograph amplifiers. And still other wires are connected to an electrical receptacle.

Sequentially, the record changer switch must be connected to the record changer; a pair of wires must be connected to the record changer or phonograph motor; and a plurality of wires must be connected to the phonograph amplifiers. As will be appreciated, making such individual connections takes additional time.

2

Thus, it is an object of the present invention to provide a connector device suitable for slip-on connection between a record changer switch and a record changer motor.

Another object is to provide a novel device for plug-on connection between a record changer switch and an amplifier.

A further object is to provide a novel combination record changer switch and amplifier connector with means provided therebetween for connection of the switch to the record changer motor.

Another object is to provide a low cost connector for a record changer switch to connect the switch to both a record changer motor and to an amplifier, thus eliminating additional operations, including avoiding solder operations.

Yet another object of this invention is to provide a switch-connector having crimp on terminals.

Still another object of the present invention is to provide a switch-connector having a molded plastic case with integral bayonet lugs for attachment to a mounting base.

A further object of the present invention is to provide a switch-connector having a base of insulating material and adapted for inclusion of a ground pin for connection with a plug-in connector.

It is a further object of the present invention to provide a switch-connector having provision for receipt of a plug-in connector, which connector may be of more than one design, and yet which is keyed relative to the switch-connector to prevent inadvertent plugging-in in reversed position.

These and other objects of the invention will become clear from the following detailed discussion of the invention in conjunction with the appended claims and drawing wherein:

Figures 1, 2, 3, 4:
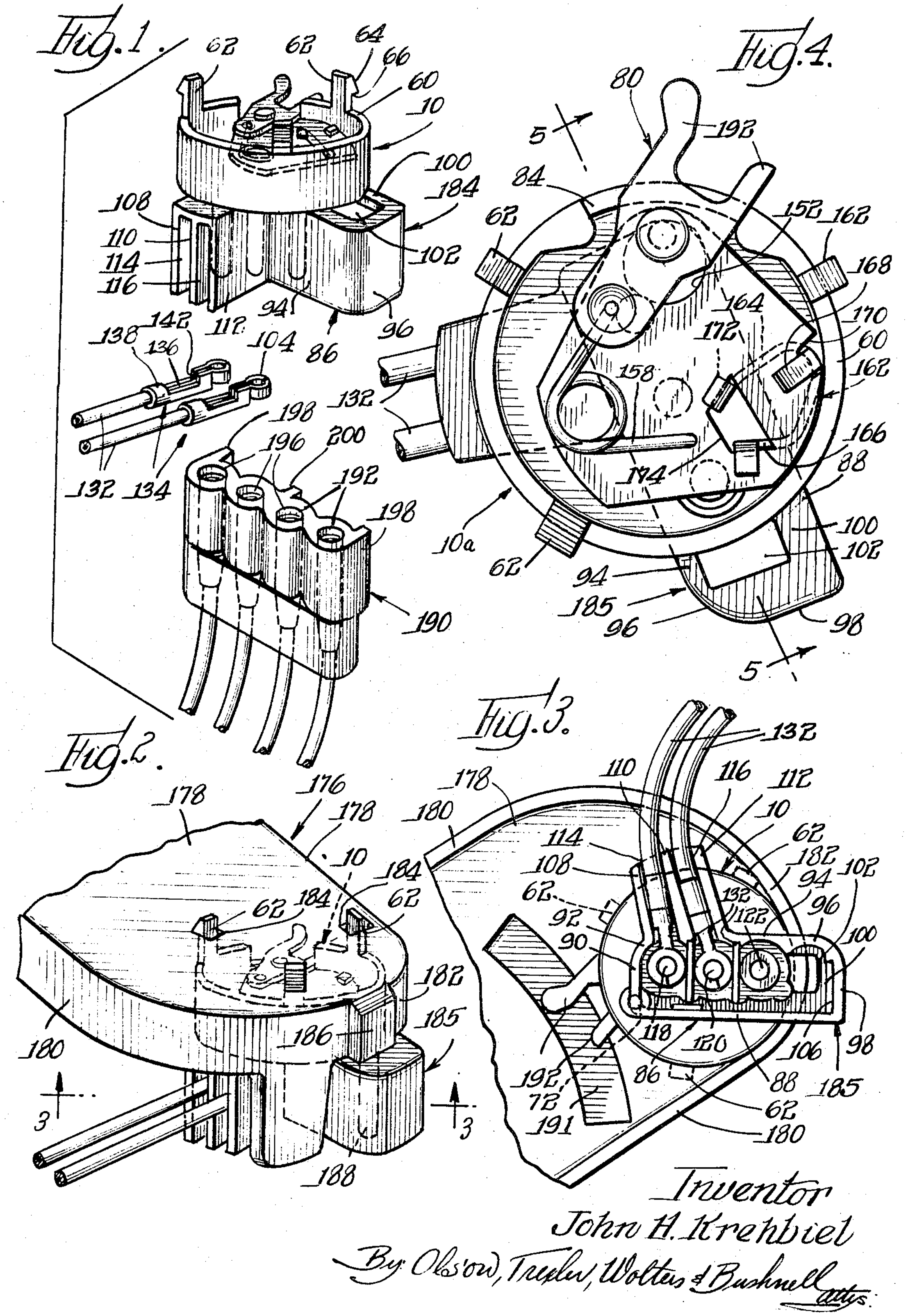
FIG. 1 is an exploded perspective view showing a preferred form of the invention.
FIG. 2 is a perspective view showing the switch-connector of FIG. 1 as assembled with a base casting forming a part of a phonograph record changer unit.
FIG. 3 is an underside view of the structure of FIG. 2, as taken substantially along the line 3—3 in FIG. 2.
FIG. 4 is a top plan view of the switch-connector on an enlarged scale.

With reference to FIGS. 1–8, there is shown a switch housing 10 molded of a suitable plastic. Lexan is one suitable material, although many others are quite acceptable. The switch housing 10 includes a cylindrical wall 60 having at its upper edge three integral, upstanding ears, tabs or prongs 62 of a bayonet nature, the upper end of each having a tapered entering surface 64 and an underlying shoulder 66. As will be apparent shortly hereinafter, these prongs are adapted for mounting the switch housing on a part of the base casting of a record changer or the like. The prongs are conveniently three in number and are equally arcuately spaced, although other numbers could be used, and the spacing could be different. As will be appreciated, the plastic material of the molded housing is inherently somewhat flexible, and this allows the prongs to flex inwardly radially of the housing during installation, it being apparent that the oblique or cam surfaces 64 are disposed radially out.

The wall 60 is closed at the underside by a transverse wall, floor or partition 68. A boss 70 (FIGS. 5 and 8) upstands from the partition 68 adjacent the wall 60 and receives a force-fitted knurled pin 72. An insulated, somewhat sector shaped switch actuator 74 is pivoted on this pin above a relatively thin spacer 76 and below a relatively thick spacer 78. A switch arm 80 overlies the thick washer and is trapped beneath the head 82 of the pin. The wall 60 is provided with a cutout or recess 84 (FIG. 6) at the upper edge thereof through which the switch arm 80 projects. Other details of the sector, switch arm, and associated parts will be set forth hereinafter in connection with the operation of the switch. However, it is to be understood that the specific switch as herein shown and described need not be employed, and that a slide switch, for example, could be used instead of a pivoted switch.

Figures 5, 6, 7, 8, 9, 10:
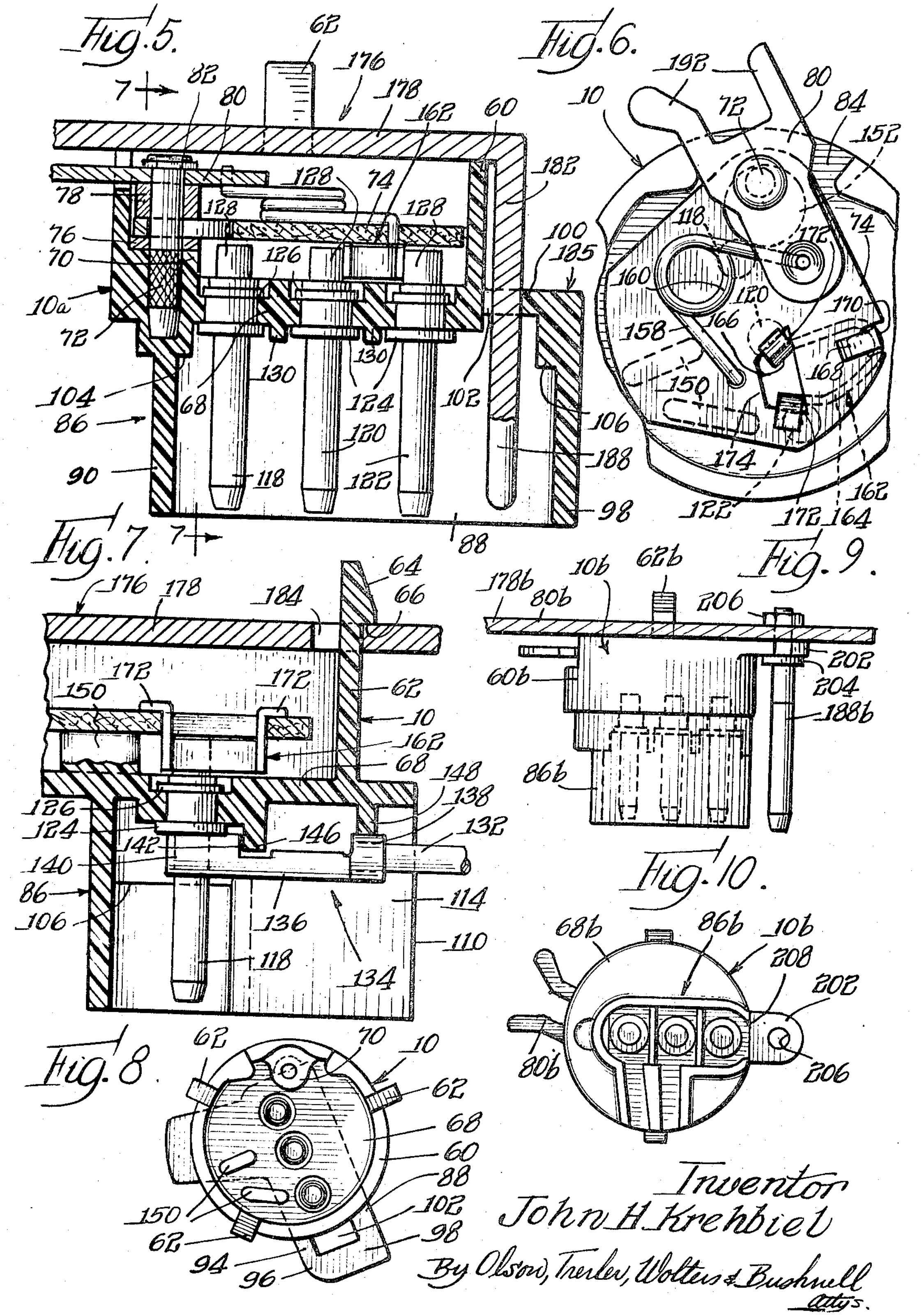
FIG. 5 is a vertical sectional view through the preferred form of the switch-connector as taken substantially along the line 5—5 in FIG. 4.
FIG. 6 is a fragmentary view similar to FIG. 4 and showing the parts in a different position, being taken substantially along the line 6—6 in FIG. 5.
FIG. 7 is a fragmentary vertical sectional view taken substantially along the line 7—7 in FIG. 5.
FIG. 8 is a plan view of the molded housing or casing per se.
FIG. 9 is a side view of a modified form of the invention.
FIG. 10 is a bottom view of the modification of FIG. 9.

A socket 86 depends from the floor or wall 68, and the shape thereof is perhaps best seen in FIGS. 1, 3 and 5. The socket is molded integral with the housing 10*a* and includes a flat, vertical wall 88 arranged chordally of the wall 60 and extending therebeyond. A relatively short sidewall 90 extends from one end of the chordal wall 88 and curves at 92 into substantial alignment with a shorter wall 94 parallel to the wall 88. The wall 94, like the wall 88 extends beyond the circumferential or cylindrical wall 60 to a curved wall portion 96 leading to a short transverse wall 98 which joins the wall 88 at substantially a right angle. The wall portions projecting beyond the cylindrical wall 60 are provided with a partial floor 100 substantially coplanar with the transverse wall 68, but of lesser thickness, and further having a rectangular aperture 102 therethrough.

A depending boss 104 (FIG. 5) straddling the upper portion of the wall 90 receives the lower end of the pin 72, and also serves as a limit stop for insertion of a plug, as will be set forth hereinafter. There is a shoulder 106 on the inside of the wall 98 at the same level as the bottom of the boss 104, serving as another limit stop.

Three lateral walls 108, 110, and 112 (FIGS. 1 and 3) extend from between the curved wall portion 92 and the wall 94 to provide entrance spaces or chutes 114 and 116, the significance of which will be brought out in greater detail hereinafter.

Three metal contact pins, 118, 120 and 122 (FIGS. 3 and 5) are fixed in the floor 68 and depend within the socket 86. Each of the pins, as best seen in FIG. 5, is provided with an integral flange 124 clamped against the underside of the floor 86, and with an upper flange 126 clamped against the upper surface of a recess in the top of the floor. The pins further include upstanding contact portions 128 disposed within the circular wall 60. In the present embodiment of the invention the upstanding contact 128 of the pin 118 is idle, but it is more convenient to make this pin the same as the other two than it would be to eliminate the contact portion. In any event, this contact portion might be used in other embodiments of the invention. Depending integral transverse walls 130 extend between the pins 118, 120, and 122.

As seen particularly in FIGS. 1, 3, and 7, there are two motor leads or wires 132 adapted to be connected to the first two pins, namely, pins 118 and 120. Each of these leads is provided with a sheet metal terminal clip 134 having a ferrule 136 clamping about the bared end of the wire, and a collar 138 clamping about the insulation on the wire. The ferrule and collar are both split longitudinally so that they may be formed from a flat blank of sheet metal and curled around the bare wire and insulation respectively. In addition, each terminal clip 134 is provided with a pair of upstanding, curved side arms 140 adapted to grip the respective pins 118, 120, and having at the end disposed toward the wire a shoulder 142. A depending wall 146 of rather shallow height and substantially colinear with the wall 94 is abutted by each of the shoulders 142 securely to anchor each clip in position without exerting any lateral thrust on the corresponding pins 118, 120. There is further a pair of stub walls 148 depending from the floor 68 and respectively in the chutes or slots 114, 116 and against which the collars 138 rest to insure perpendicularity of the clips 134 to the pins 118, 120. As will be observed particularly in FIG. 7, the shoulder 106 depends slightly below the clips 134, as does the boss 104.

In addition to the parts shown and described, the molded plastic housing 10 includes a pair of upstanding, spaced apart short walls 150 seen in FIG. 8, and seen in phantom in FIG. 6. The sector-like switch operator 74 rides on top of these walls and is positioned by them as well as by the pivot pin 72. As may be seen in FIGS. 4 and 6, the hole 152 of the switch actuator receiving the pin 72 is rather substantially larger than the diameter of the pin. However, a substantially V-shaped, over-centering spring 158 securely holds the switch actuator in proper position. One end of the spring 158 is hooked up through a hole in the inner end of the switch arm 80, while the other end is hooked down through a hole in the insulating switch actuator 74. As will be apparent, there is a helical section 160 at the apex of the spring. The spring 158 serves three functions. It urges the switch actuator 74 outwards away from the pin 72, whereby to hold it properly between the spacers 76 and 78, it holds the actuator 74 down against the stub wall 150, and it also serves as an overcentering spring for snapping the switch actuator between the positions shown in FIGS. 4 and 6, respectively. In FIG. 4 the actuator is in a position such that the switch is open while in FIG. 6 the switch is closed.

A metallic movable switch contact or shorting bar 162 (FIGS. 4, 6 and 7) is secured to the underside of the switch actuator and comprises a substantially V-shaped member having diverging arms 164 with inwardly directed tips 166. The shorting bar 162 is provided at its apex with a tab 168 extending up over the outer edge of the switch actuator (this may be eyeletted to the actuator 74 by known procedures, if desired), preferably through a notch 170 therein. The inwardly directed tips 166 are provided with upstanding tabs 172 which extend up through a hole 174 in the actuator, and which are bent outwardly relatively away from one another. When the actuator moves to the contact-closing position of FIG. 6, the inwardly directed arm tips 166 abut the upstanding contact ends or portions 128 of the pins 120 and 122. This causes the inwardly directed ends or tips 166 to flex inwardly somewhat, and this is permitted by the fact that the tabs 172 are bent somewhat outwardly and are free to move toward one another upon flexing of the shorting bar 166. It will be apparent that this not only makes up for slight variations in tolerances, but also provides a wiping action between the tips 166 and the contact portions 128 of the pins, whereby to keep the contacts clean and to insure good electrical engagement.

A portion of an associated device, conveniently an automatic record player, is shown at 176. The portion of the device shown comprises a zinc or the like die casting, comprising a substantially flat floor 178 and a depending peripheral wall 180 having an arcuate end portion 182. The housing 10 fits snugly against the end portion 182 of the wall 180, and the prongs 62 extend up through corresponding holes 184 in the floor 178, snapping into place permanently to secure the switch-connector in position. It will be apparent that no upper wall is necessary for the housing, since the floor 178 serves to close off the top of the housing.

The end portion of the socket 86, including the wall 98 and the top hole 102, projects out beneath the peripheral wall or skirt 180, as indicated generally at 185. A boss or protuberance 186 (FIG. 2) is formed integral with the wall 180 on the curved portion 182 thereof, and an integral die cast pin 188 depends therefrom. This pin depends through the hole 102 into the socket 86 in spaced parallelism with the pins 118, 120, and 122. It will be understood that this pin forms a grounding pin for the electrical system.

The underside of the floor 178 is provided with an arcuate track 191 (FIG. 3) in which a part of the record changer mechanism moves. The outer end of the switch operator 80 is bifurcated, comprising a pair of spaced arms 192, one of which is angled out as shown. The bifurcated end or arms 192 underlies the arcuate track 191 so that the operator 80 might be moved back and forth by the moving part of the record changer mechanism. As will be appreciated, the inner end of the operator 80 acts on the V-shaped spring 158 to move it through a dead center position relative to the attachment of the spring to a switch actuator 74, and thus to snap the actuator from one position to the other.

A plug 190 for association with the socket 86 may be seen in FIG. 1. This plug is made of a suitable U.L. approved thermoplastic material, nylon being one satisfactory example. The lower portion of the plug is generally flat with rounded ends, and continues up to an upper portion formed substantially in the shape of a plurality of adjoined cylinders 192 having bores 196 therein receiving preferably crimp-on terminals similar to the terminals 50 heretofore shown and described. The plug 190 is provided with a pair of flanges 198 at the corners on one side and with a central projecting flange or nib 200 for keying the plug to the socket. As will be appreciated, the outer curved corners are received adjacent the curved wall sections 92 and 96, while the projecting flanges 198 fit in the corners between the walls 88 and 90 and 88 and 98. Three of the terminals in the bores 196 receive the pins 118, 120 and 122, while the fourth terminal clip receives the grounding pin 188.

A further modification of the invention is shown in FIGS. 9 and 10. Most of the parts herein are similar to those just shown and described, and for convenience are identified by like numerals with the addition of the suffix *b*, thereby to avoid duplication of description.

The significant difference in the embodiments of FIGS. 9 and 10 is that it is intended for use with a record changer or the like that does not have an integral grounding pin. On the contrary, in FIGS. 9 and 10 the housing is provided with an integral, laterally extending ear 202, formed of the same plastic as the remainder of the housing. This ear fits flat against the underside of the floor **178*b*, and a pin 188*b*, having a shoulder or stop 204 thereon, is inserted through the ear, the latter being provided with an aperture 206, and through the aligned aperture in the floor. In the specific embodiment shown, a nut 206 is threaded on the upper end of the pin to hold it in place and to provide a firm electrical engagement with floor 178*b*. It will be appreciated that the pin also could be held in place by swaging or staking. The socket 86*b* is left open at one end as indicated at 208 in order that the accompanying plug might extend outwardly therefrom for engagement with the pin 188*b*. It will be appreciated that the plug would have a pair of opposed flutes or grooves therein in order that the plug might extend through the gap 208**, and by this means be keyed to the socket so as to avoid insertion in a reversed position.

While specific embodiments of the invention have been described above, the invention should not be limited thereto since many additional modifications of the invention may be apparent to those skilled in the art. Thus, it contemplated by the appended claims to cover all such modifications as fall within the true spirit and scope of the invention.

The invention is hereby claimed as follows:

1. A switch-connector comprising a housing having longitudinal and transverse dimensions, a transverse wall in said housing, a switch in said housing disposed longitudinally on one side of said wall and including a movable switch operator, a plurality of connector pins fixed to said housing and extending from said transverse wall longitudinally in the opposite direction from said switch and also extending through said transverse wall toward said switch, a skirt extending longitudinally from said transverse wall beyond said pins and encircling said pins in laterally spaced relation thereto, a plurality of spaced, substantially parallel walls extending transversely of said skirt and longitudinally of said transverse wall and defining a pair of chutes communicating with at least two of said pins, said chutes opening longitudinally and transversely, a pair of wires extending through said chutes transversely of said housing, an apertured terminal on each of said wires respectively detachably received on a corresponding pin, and a complementary separable electric connector having a housing received at least in part in said skirt and further having a plurality of female electric connectors respectively detachably receiving said pins.

2. A switch-connector as set forth in claim 1 wherein each of said wire terminals has a shoulder, and further including stop means in said chutes engageable behind said shoulders for strain relief.

3. A switch-connector as set forth in claim 2 and further including abutment means in said chutes engaging said wire terminals longitudinally of said housing for accurate positioning of said wire terminals.

4. In combination with a metallic base plate, a switch-connector combination comprising a housing having longitudinal and transverse dimensions, means coacting between said housing and said base plate to mount said switch-connector on said base plate, said housing being substantially cylindrical about a longitudinal axis and having a transverse wall spaced from said base plate and substantially parallel thereto, a switch mounted in said housing between said transverse wall and said base plate and including a movable switch actuator extending transversely from said cylindrical housing through an opening therein, a plurality of male connector pins fixed to said transverse wall and extending longitudinally therefrom away from said base plate in substantially straight line, parallel array and also extending through said transverse wall in the direction of said base plate, a skirt on said housing surrounding said pins in laterally spaced relation thereto and extending longitudinally from said transverse wall beyond said pins, said skirt being oblong in cross section, a complementary electrical connector having a body received at least in part in said skirt and further having a plurality of female electrical connectors detachably receiving said pins, and a ground pin extending from said base plate in substantially parallel, straight line array with said male connector pins adjacent said skirt and laterally spaced from said connector pins, said ground pin being received in one of said female connectors, said housing further including a plurality of walls extending longitudinally from said transverse wall and transversely from said skirt, said walls defining a pair of chutes communicating with a pair of said male connector pins, said chutes opening longitudinally and transversely of said housing, and a pair of wires respectively extending through said chutes, between said transverse wall and said connector body, said wires having apertured terminals on the ends thereof respectively received on a pair of said pins.

5. The combination as set forth in claim 4 wherein said ground pin is integral with said base plate, said skirt extends transversely beyond said cylindrical housing, and said ground pin extends within said skirt.

6. The combination as set forth in claim 4 wherein said ground pin is outside said skirt, said skirt opening transversely of said housing and said connector body extending transversely from said skirt and receiving said ground pin.

7. In combination with a metallic base plate, a switch-connector combination comprising: a housing of insulating material having longitudinal and transverse dimensions, means coacting between said housing and said base plate to mount said switch-connector on said base plate, said housing being substantially cylindrical about a longitudinal axis and having a transverse wall spaced from said base plate and substantially parallel thereto, a pair of fixed contacts in the housing mounted on said transverse wall, a bridging contact movably disposed in the housing, manually operable means for moving the bridging contact into engagement with the fixed contacts, three male connector pins fixed to said transverse wall and extending longitudinally therefrom away from said base plate in a substantially straight line, parallel, array and also extending through said transverse wall in the direction of said base plate, two of said male connector pins connected to said fixed contacts, a skirt of insulating material on said housing surrounding said pins in laterally spaced relation thereto and extending longitudinally from said transverse wall beyond said pins, said skirt being oblong in cross section, said oblong skirt being provided with access means in its elongated side comprising a cutout portion with a pair of substantially parallel walls of insulating material extending transversely of said cutout portion and longitudinally of said transverse wall, a complementary electrical connector having a body received at least in part in said skirt and further having a plurality of female electrical connectors detachably receiving said pins, and a ground pin extending from said base plate in substantially parallel, straight line array with said male connector pins adjacent said skirt and laterally spaced from said connector pins, said ground pin being directly connected both physically and electrically to said base plate exteriorly of said cylindrical housing and extending past said transverse wall, said complementary electrical connector extending transversely beyond said cylindrical housing and one of the female connectors therein receiving said ground pin.

References Cited

UNITED STATES PATENTS

| | | | |
|---|---|---|---|
| 3,209,091 | 9/1965 | Freathy et al. | 200—51 |
| 714,869 | 12/1902 | Cravens | 339—211 |
| 2,728,060 | 12/1955 | Doeq | 339—191 |
| 3,016,512 | 1/1962 | Borchard | 339—14 |
| 1,891,153 | 12/1932 | Gates. | |
| 2,211,815 | 8/1940 | Hansson | 200—51 |
| 2,513,147 | 6/1950 | Chorpening | 174—51 |
| 2,682,646 | 6/1954 | Hubbell | 174—51 |
| 2,706,225 | 4/1955 | Freeman | 200—51 |
| 3,014,977 | 12/1961 | Geisen. | |
| 3,015,706 | 1/1962 | Fichter. | |
| 3,066,275 | 11/1962 | Hammell | 339 |
| 3,177,458 | 4/1965 | Buchanan | 29 |

FOREIGN PATENTS

| | | |
|---|---|---|
| 1,288,947 | 2/1962 | France. |
| 1,313,951 | 11/1962 | France. |

DAVID SMITH, Jr., *Primary Examiner.*

ROBERT K. SCHAEFER, *Assistant Examiner.*

U.S. Cl. X.R.

174—51; 339—153, 198